(12) United States Patent
Wallace-Riley

(10) Patent No.: US 9,623,889 B2
(45) Date of Patent: Apr. 18, 2017

(54) STORAGE AND TRANSPORT APPARATUS AND METHOD OF USING SAME

(71) Applicant: Aisha Wallace-Riley, Charlotte, NC (US)

(72) Inventor: Aisha Wallace-Riley, Charlotte, NC (US)

(73) Assignee: One Stop Kart, LLC, Charlotte, NC (US)

( * ) Notice: Subject to any disclaimer, the term of this patent is extended or adjusted under 35 U.S.C. 154(b) by 212 days.

(21) Appl. No.: 14/456,292

(22) Filed: Aug. 11, 2014

(65) Prior Publication Data

US 2015/0118006 A1 Apr. 30, 2015

Related U.S. Application Data

(60) Provisional application No. 61/962,100, filed on Oct. 31, 2013.

(51) Int. Cl.
*B62B 3/00* (2006.01)
*B62B 3/02* (2006.01)

(52) U.S. Cl.
CPC .............. *B62B 3/022* (2013.01); *B62B 3/004* (2013.01); *B62B 3/005* (2013.01); *B62B 3/008* (2013.01); *B62B 3/025* (2013.01)

(58) Field of Classification Search
CPC ......... B62B 3/022; B62B 3/004; B62B 3/005; B62B 3/008; B62B 3/025; E06B 9/56
USPC ..... 414/800; 108/54.1; 211/85.8, 41.6, 70.4, 211/41.15
See application file for complete search history.

(56) References Cited

U.S. PATENT DOCUMENTS

| | | | | |
|---|---|---|---|---|
| 3,698,733 A | * | 10/1972 | Isaacs | B62B 3/002 206/511 |
| 4,239,258 A | * | 12/1980 | Burris | B62D 63/061 280/639 |
| 4,637,626 A | * | 1/1987 | Foss | A45C 13/385 16/113.1 |
| 4,786,073 A | * | 11/1988 | Harper | B62D 63/061 280/491.1 |
| 5,040,809 A | * | 8/1991 | Yang | B62B 3/02 280/42 |
| 5,131,450 A | * | 7/1992 | Lichy | B60J 1/2013 160/273.1 |
| 5,572,854 A | * | 11/1996 | Greiner | B65D 19/12 53/390 |

(Continued)

*Primary Examiner* — Michael McCullough
*Assistant Examiner* — Lynn Schwenning
(74) *Attorney, Agent, or Firm* — Ashley Law Firm P.C.; Stephen S. Ashley, Jr.

(57) ABSTRACT

A transport and storage apparatus includes two support members pivotally connected to a substantially rectangular base platform at opposed sides of the platform, and a plurality of wheels are attached to the bottom surface of the base platform. The base can include first and second end sections pivotally connected to a mid-section. The apparatus can be moved between a loading position in which the mid-section, the first end section and the second end section are substantially co-planar and the support members extend substantially upwardly from the base platform, to a storage position in which the support members lie flat on the upper surface of the base platform and the first and second end sections extend substantially perpendicular to the mid-section.

19 Claims, 12 Drawing Sheets

(56) References Cited

U.S. PATENT DOCUMENTS

| | | | | |
|---|---|---|---|---|
| 6,095,532 A * | 8/2000 | Martin | .................... | B25H 5/00 |
| | | | | 280/30 |
| 6,700,765 B2 * | 3/2004 | Ely | ....................... | H02H 7/067 |
| | | | | 257/355 |
| 6,725,871 B1 * | 4/2004 | Shearer | .................. | B63B 17/02 |
| | | | | 114/361 |
| 6,733,026 B1 * | 5/2004 | Robberson | ............... | B62B 3/02 |
| | | | | 280/30 |
| 7,052,033 B2 * | 5/2006 | McDonell | .............. | B60D 1/155 |
| | | | | 280/639 |
| 7,731,221 B2 * | 6/2010 | Bess | ........................ | B62B 3/02 |
| | | | | 280/30 |
| 8,042,829 B2 * | 10/2011 | Hailston | ................ | B62B 3/008 |
| | | | | 280/30 |
| 8,388,017 B2 * | 3/2013 | Alexander | ........... | B62D 63/061 |
| | | | | 280/656 |
| 2002/0125730 A1 * | 9/2002 | Burks | .................... | B60J 11/02 |
| | | | | 296/98 |
| 2005/0011135 A1 * | 1/2005 | Hallberg | ................. | E04H 3/28 |
| | | | | 52/7 |
| 2008/0073301 A1 * | 3/2008 | Van Conkelberge | .. | B65D 19/44 |
| | | | | 211/104 |
| 2010/0252465 A1 * | 10/2010 | Pryor | ................... | A63B 55/406 |
| | | | | 206/315.4 |
| 2011/0049843 A1 * | 3/2011 | Radlow | .................. | B62B 3/025 |
| | | | | 280/651 |
| 2012/0018966 A1 * | 1/2012 | Moore | .................... | B62B 3/002 |
| | | | | 280/79.11 |
| 2013/0038038 A1 * | 2/2013 | Bernard | .............. | B62D 63/062 |
| | | | | 280/415.1 |

\* cited by examiner

STORAGE AND TRANSPORT APPARATUS AND METHOD OF USING SAME

CROSS REFERENCE TO RELATED APPLICATIONS

This application claims benefit to U.S. Provisional Patent Application No. 61/962,100, filed Oct. 31, 2013, which is incorporated herein.

TECHNICAL FIELD AND BACKGROUND OF THE INVENTION

The present invention relates to an apparatus for storing and transporting items. One embodiment of the invention comprises a collapsible storage and transport that is particularly suited for storing and transporting the typical contents of a one room apartment or college dormitory room.

Moving from one residence or office to another can be a time consuming and tiring experience. One factor that contributes to the time necessary to move is that it is often necessary to make many return trips back and forth in order to move all items. Multiple return trips is particularly time consuming in large structures, such as apartment buildings and college dormitories. Another factor is that items are often dumped into one large single container for transport, which results in having to sift through and reorganize the different items upon reaching their destination.

SUMMARY OF INVENTION

Therefore, one object of the present invention is to provide an apparatus that is particularly suited for moving an one room apartment or college dormitory room. Another object of the present invention is to reduce the number of trips that are typically necessary when moving. Yet another object of the present invention is to provide a transport apparatus, in which items can be kept separated and organized while being moved. These and other objects of the invention can be obtained in preferred embodiments of the invention described below.

One embodiment of the invention comprises a lightweight, durable and compact storage and transport case that can help consumers move various items easily in one trip versus making several trips. The apparatus can operate like a dolly, and can hold many items like a trunk or plastic storage container, while having the more sophisticated appearance of luggage. The apparatus can store different items, such as electronics, clothing, and cleaning supplies. The apparatus has a sturdy rectangular platform base from which either one or two storage-shelves can be raised, providing users with three different possible levels of storage. The apparatus has a frame that allows the unit to collapse and fold for easy storage. The apparatus is durable yet lightweight and can be produced in a variety of sizes, colors, and textures. The apparatus can also have a school or team logo displayed thereon.

According to a preferred embodiment of the invention, a transport and storage apparatus comprises a substantially rectangular base platform for carrying a load thereon. The base platform has a top surface and a bottom surface, first and second opposed sides, and third and fourth opposed sides substantially perpendicular to the first and second opposed sides. The base platform comprises first and second end sections pivotally connected to a mid-section. A plurality of wheels are attached to the bottom surface of the base platform. A first support member is pivotally connected to the upper surface of the base platform proximate the first side of the base platform, and a second support member is pivotally connected to the upper surface of the base platform proximate the second side of the base platform. The apparatus is moveable between a loading position in which the mid-section, the first end section and the second end section are substantially co-planar and the support members extend substantially upwardly from the base platform, to a storage position in which the support members lie flat on the upper surface of the base platform and the first and second end sections extend substantially perpendicular to the mid-section.

According to another preferred embodiment of the invention, the apparatus includes one or more shelf sections. Each shelf section is comprised of a layer of fabric wound on a roll-up mechanism positioned on the first support member and releasably engaged to the second support member.

According to another preferred embodiment of the invention, a method of transporting items comprises providing a storage and transport apparatus comprising a base platform having a top surface and a bottom surface, first and second opposed sides, and first and second end sections pivotally connected to a mid-section. A plurality of wheels are attached to the bottom surface of the base platform. A first support member is pivotally connected to the upper surface of the base platform proximate the first side of the base platform, and a second support member is pivotally connected to the upper surface of the base platform proximate the second side of the base platform. The apparatus can include at least one shelf section comprising a layer of fabric wound on a roll-up mechanism positioned on the first support member and releasably attached to the second support member. The apparatus is moveable between a loading position in which the mid-section, the first end section and the second end section are substantially co-planar and the support members extend substantially upwardly from the base platform, to a storage position wherein the support members lie flat on the upper surface of the base platform and the first and second end sections extend substantially perpendicular to the mid-section. The apparatus can be moved to the loading position, and the shelf section can be releasably attached to the second support member. Items can be loaded on the base platform and the shelf section.

According to another preferred embodiment of the invention, the shelf section is released from the second support member, and the apparatus is moved to the storage position.

According to another preferred embodiment of the invention, a storage case can be easily stored before expansion. The user can expand the unit from the ground up by pulling up each compartment one at a time using small lifters on the side. After the bottom level is lifted an optional nylon separator is available from the inside of the framing. Once the separator has been attached, the next level can be expanded up from the side. The user can then expand up to the second level by pulling lifters. Another separator is available and the third and final level is available. A zip closure is available at the top of the storage case after the third level is fully expanded up.

According to another preferred embodiment of the invention, each compartment can be separated from each other using a nylon layer built in the framing of the unit, or the unit can be used for moving one large item as well. Each level can have its own expanders built into the framing. Each level can lock into place when pulled up to its full extension.

DESCRIPTION OF PREFERRED EMBODIMENTS OF THE INVENTION AND BEST MODE

Figure 1:
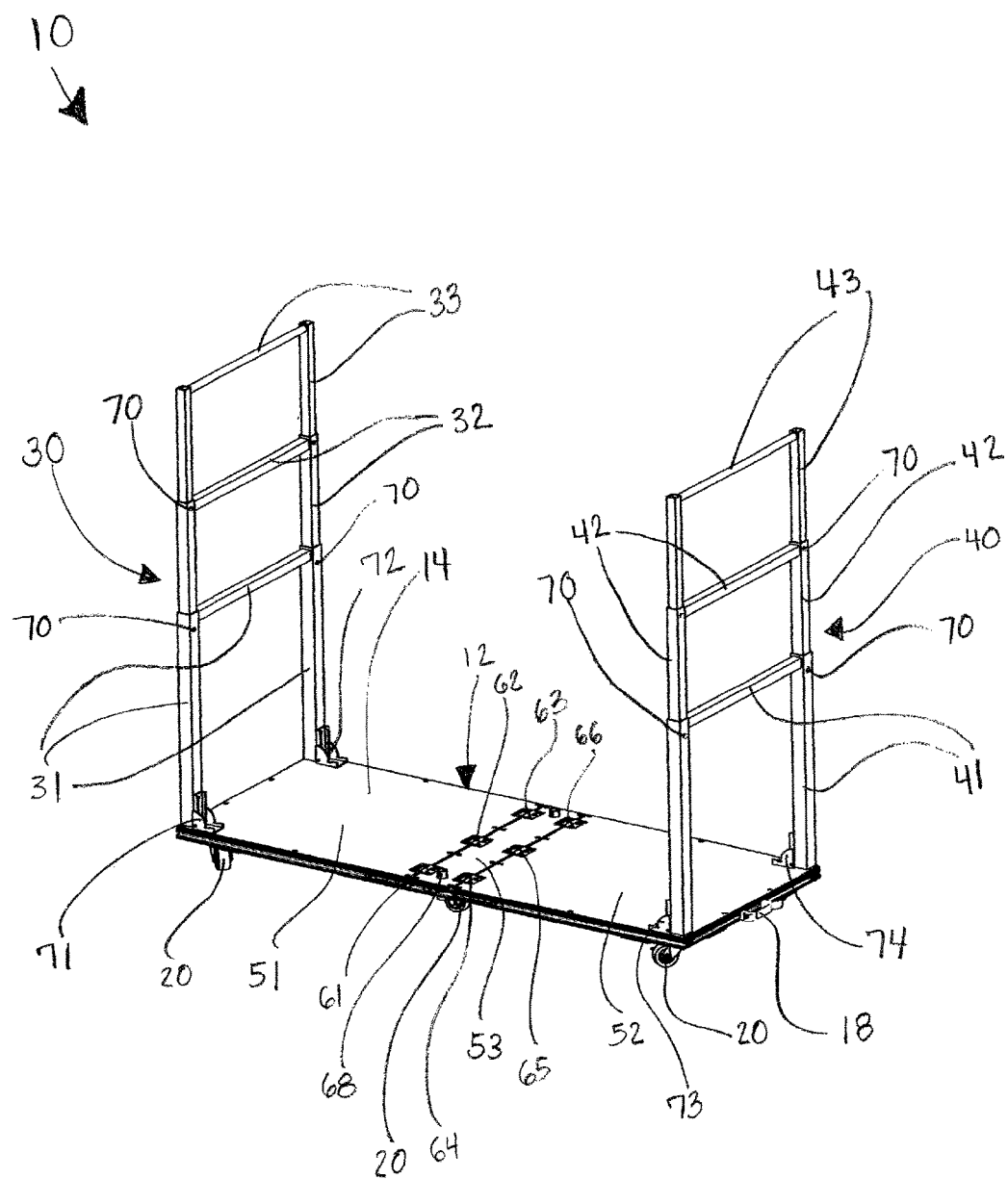
FIG. 1 is a perspective view of a storage and transport apparatus according to a preferred embodiment of the invention.

An apparatus for storing and transporting items according to a preferred embodiment of the invention is illustrated in FIGS. 1-9, and shown generally at reference numeral 10. The apparatus 10 is particularly suitable for moving items into and out of an apartment or dormitory room.

As shown in FIG. 1, the transport apparatus 10 generally comprises a rectangular base platform 12 having a top surface 14 and a bottom surface 16, with six wheels 20 positioned on the bottom surface 16 of the platform, and two support members 30, 40 pivotally connected to the upper surface of the base platform 12.

The platform 12 is comprised of two end sections 51, 52, and a mid-section 53 that are pivotally connected to each other by a plurality of hinges 61, 62, 63, 64, 65, 66. The two end sections 51, 52 are equal in area to each other, and the mid-section 53 is substantially smaller than the two end sections 51, 52, as shown in FIG. 1. One end section 51 is pivotally connected to the mid-section by a series of three hinges 61, 62, 63, and the other end section 52 is pivotally connected to the mid section by another series of three hinges 64, 65, 66, as shown in FIG. 1.

Figure 6:
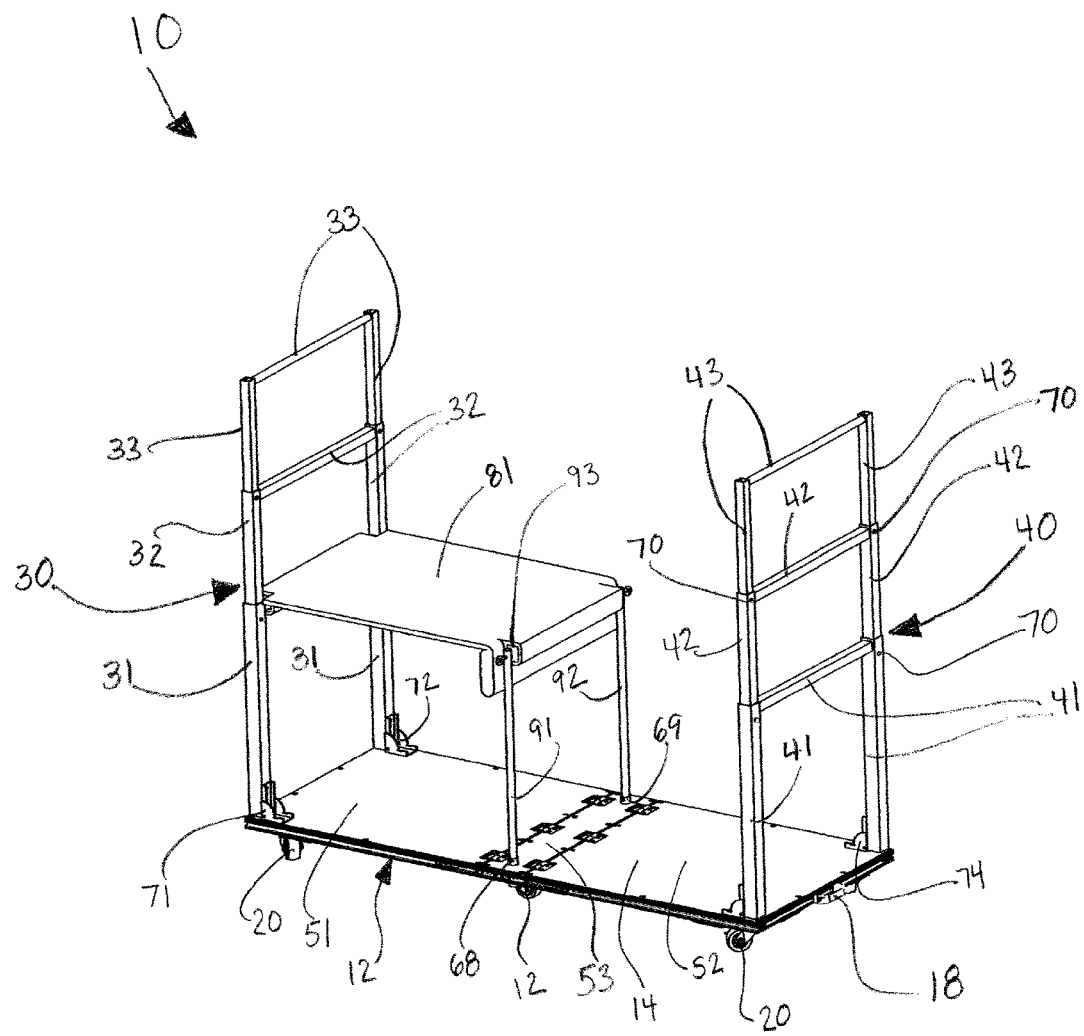
FIG. 6 is another perspective view of the apparatus of FIG. 1.

The apparatus 10 preferably has six pneumatic wheels 20 attached to the bottom surface 14 of the base platform 12. Four of the wheels 20 are positioned proximate the four corners of the platform 12, and two of the wheels 20 are positioned under the platform mid-section 53, as shown in FIG. 6. The wheels 20 provide for easy moving capability and maneuverability in tight places.

Each support member 30, 40 is comprised of three telescopically connected support segments 31, 32, 33, and 41, 42, 43, respectively. Each of the support segments 31, 32, 33, 41, 42, 43 are comprised of two parallel bars joined by a perpendicular cross bar, as shown in FIG. 1. The parallel bars are hollow to facilitate telescopic engagement of the support segments 31, 32, 33, 41, 42, 43. Support member 30 comprises lower segment 31, middle segment 32 and upper segment 33, and likewise support member 40 likewise comprises lower segment 41, middle segment 42 and upper segment 43. The parallel bars of the upper segments 33, 43 are received within the parallel bars 32, 42, respectively, and the parallel bars of the middle segments 32, 42 are received within the parallel bars of the lower segments 31, 32, respectively.

Figure 2:
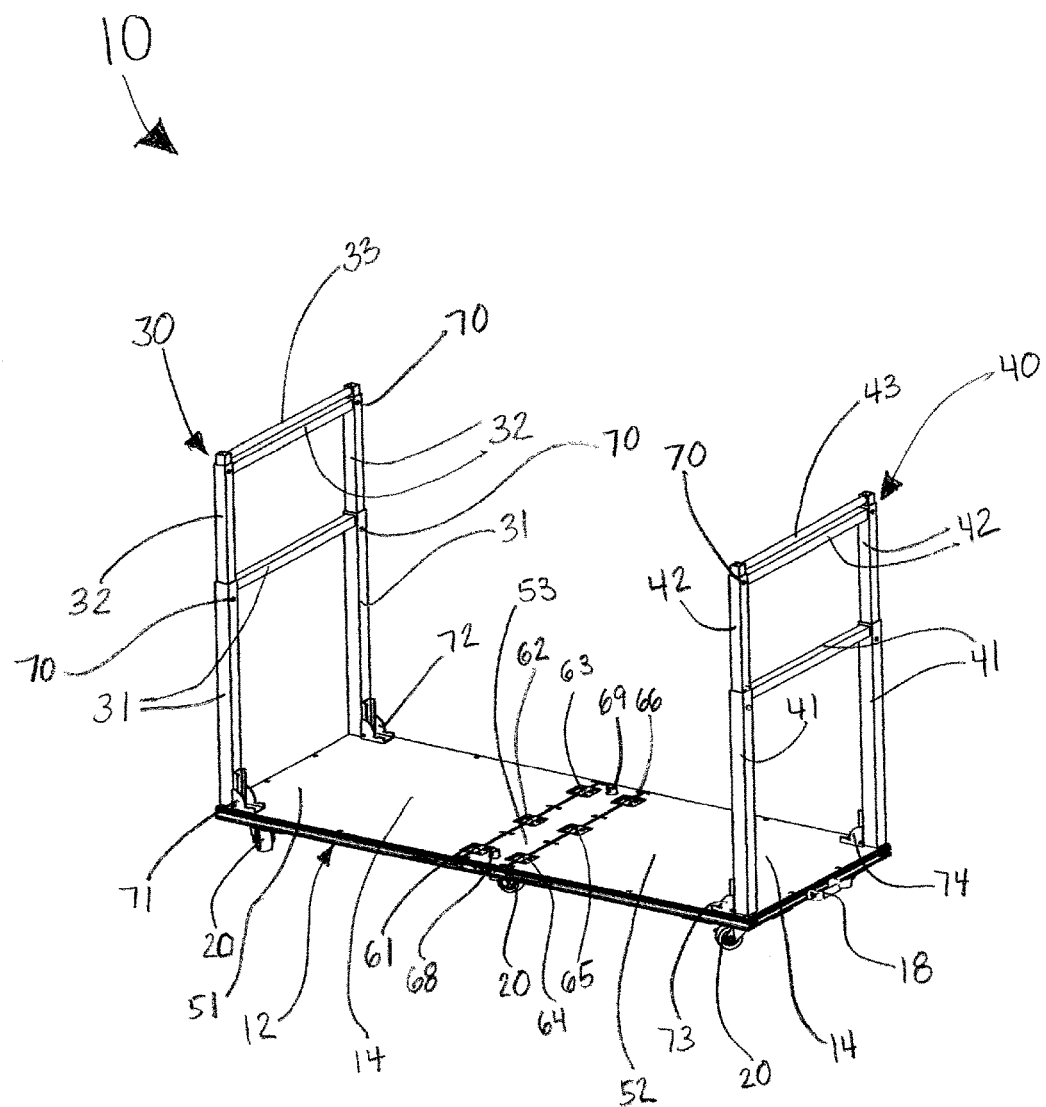
FIG. 2 is another perspective view of the apparatus of FIG. 1.
Figure 3:
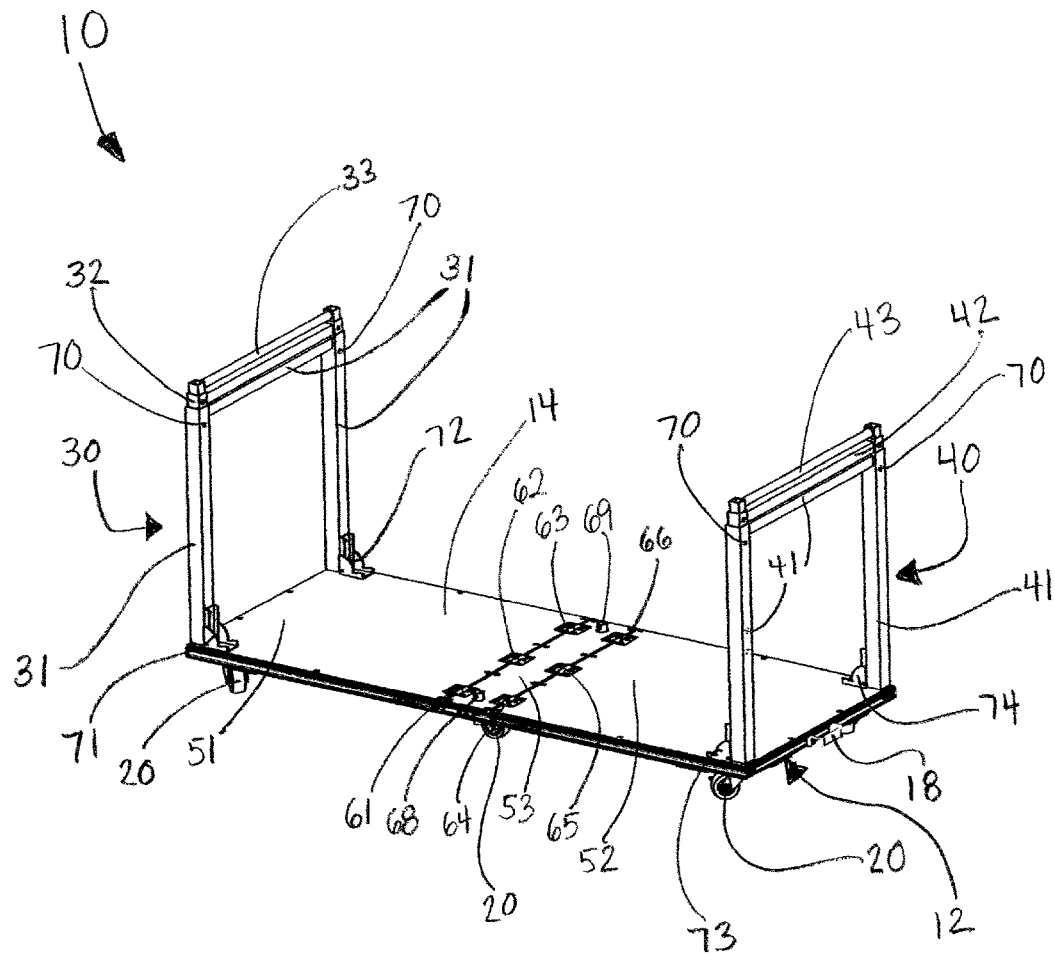
FIG. 3 is another perspective view of the apparatus of FIG. 1.

As such, the support members 30, 40 can be moved from a collapsed position, shown in FIG. 3, in which the upper segments 33, 43 are fully positioned in the middle segments 32, 42, respectively, and the middle segments 32, 42 are fully positioned in the lower segments 31, 41, respectively, to a semi-extended position, shown in FIG. 2, in which the middle segments 32, 42 only are raised from the lower segments 31, 41, respectively. The support members 30, 40 can be moved from the semi-extended position, shown in FIG. 2, to a fully extended position, shown in FIG. 1, by raising the upper segments 33, 43 from the middle segments 32, 42. The support members 30, 40 can be returned back to the collapsed position by lowering the parallel bars of the upper segments 33, 43 back into the middle segments 32, 42, and lowering the parallel bars of the middle segments 32, 42 back into lower segments 31, 41.

The apparatus 10 includes locking mechanisms for locking the middle segments 32, 42 and the upper segments 33, 43 when in extended positions. The locking mechanisms can be comprised of spring loaded snap buttons 70 positioned on the middle segments 32, 42 and the upper segments 33, 43 that fit into complementary apertures on the parallel bars of the lower segments 31, 41 and the middle segments 32, 42, respectively, when the middle segments 32, 42 and the upper segments 33, 43 are extended as shown in FIG. 1. The support members 30, 40 can be pivotally connected to the upper surface 14 of the platform 12 by hinges 71, 72, 73, 74 attached to the platform upper surface 14 and the lower end of the parallel bars of the lower segments 31, 41.

Figure 4:
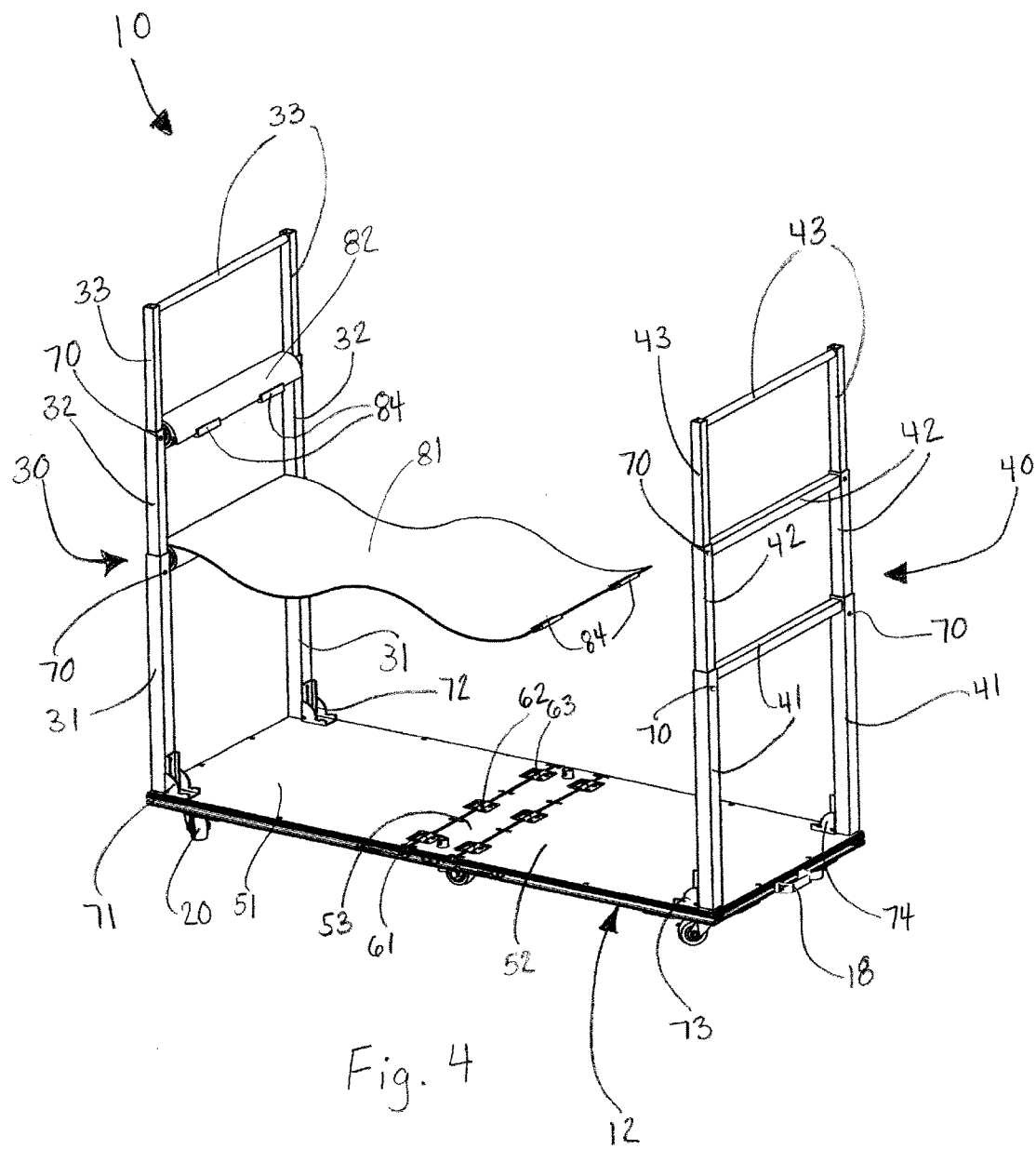
FIG. 4 is another perspective view of the apparatus of FIG. 1.
Figure 5:
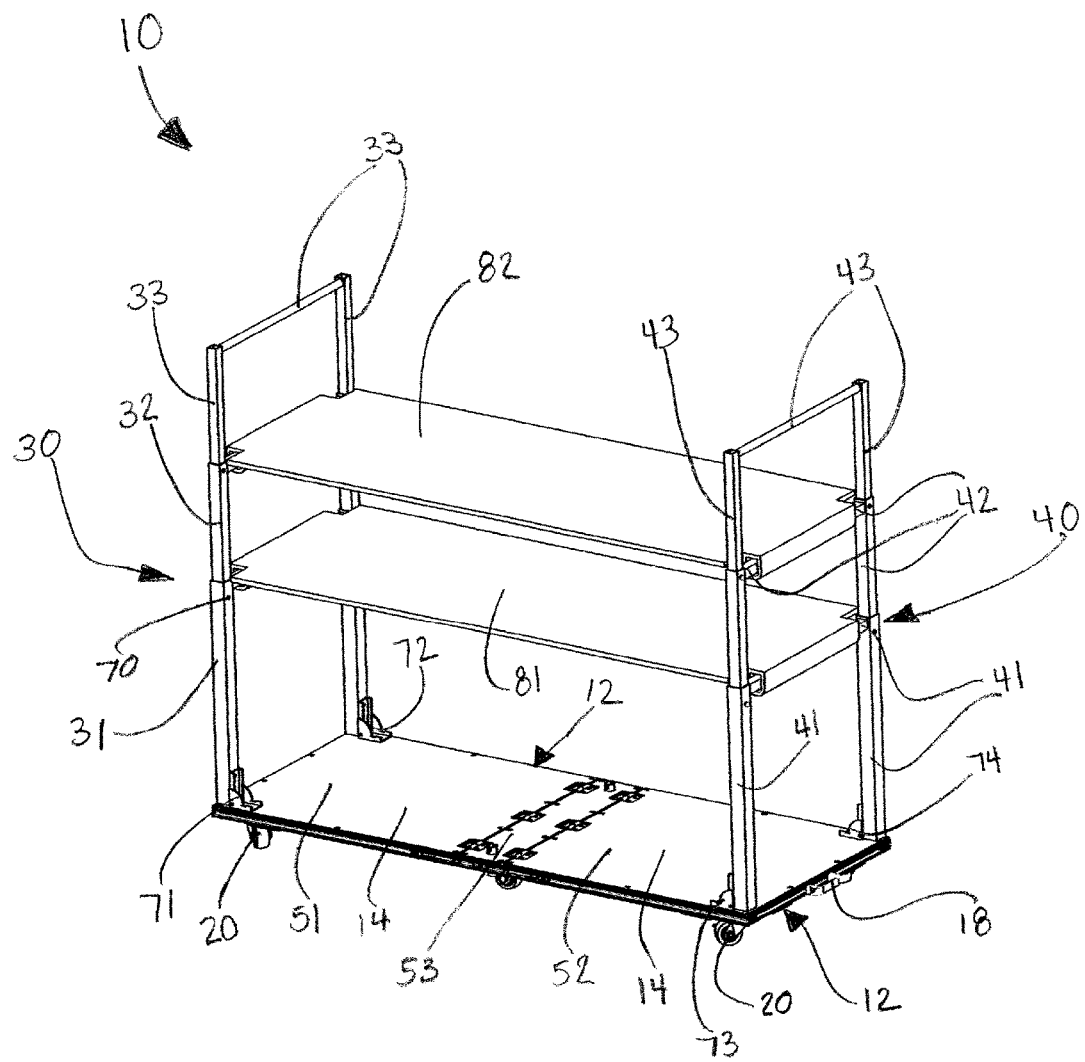
FIG. 5 is another perspective view of the apparatus of FIG. 1.
Figure 10:
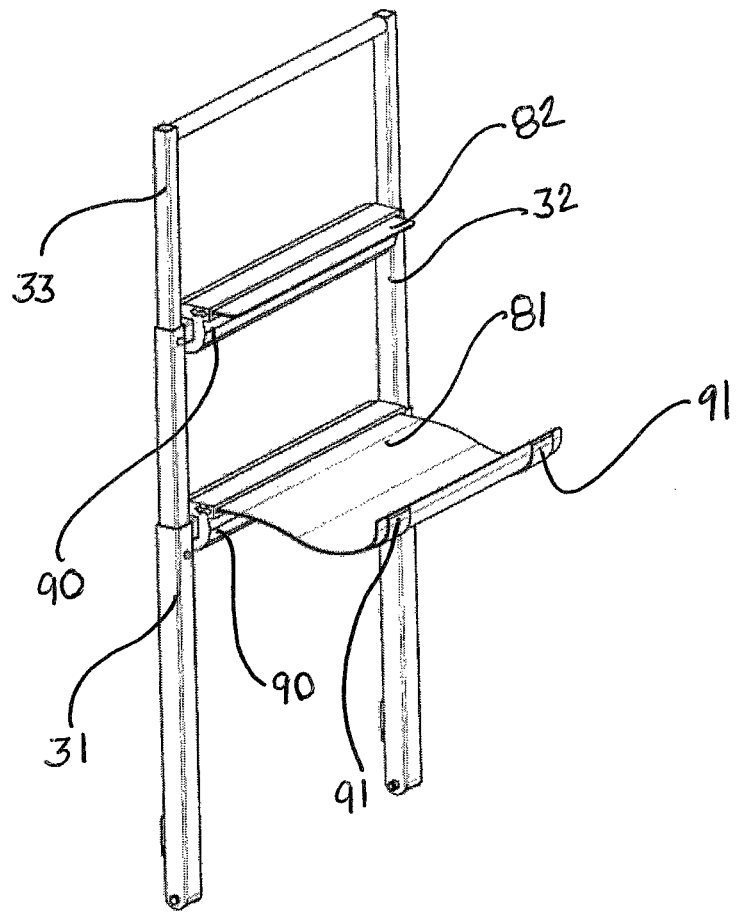
FIG. 10 is a partial perspective view of the apparatus of FIG. 1.

As shown in FIGS. 4 and 5, shelf sections 81, 82 can be attached to the cross bars of the lower and middle segments 31, 32, respectively, of support member 30. Each shelf section 81, 82 comprises a layer of fabric wound on a roll-up mechanism 90, shown in FIG. 10, positioned on a cross bar of the lower and middle segments 31, 32, respectively. The roll-up mechanism 90 can be a roller connected to a coil spring, such as in a window shade scroll. As shown in FIG. 4, the shelf sections 81, 82 can be pulled out from the cross bars of the lower and middle segments 31, 32 of support member 30 and extended over to be attached to the cross bars of the lower and middle segments 41, 42, respectively, of the other support member 40. Handles 84 can be positioned on the ends of the shelf sections, which can be grasped by the user when pulling out the shelf sections 81, 82. The shelf sections 81, 82 can be made of nylon, or other suitable material.

Figure 11:
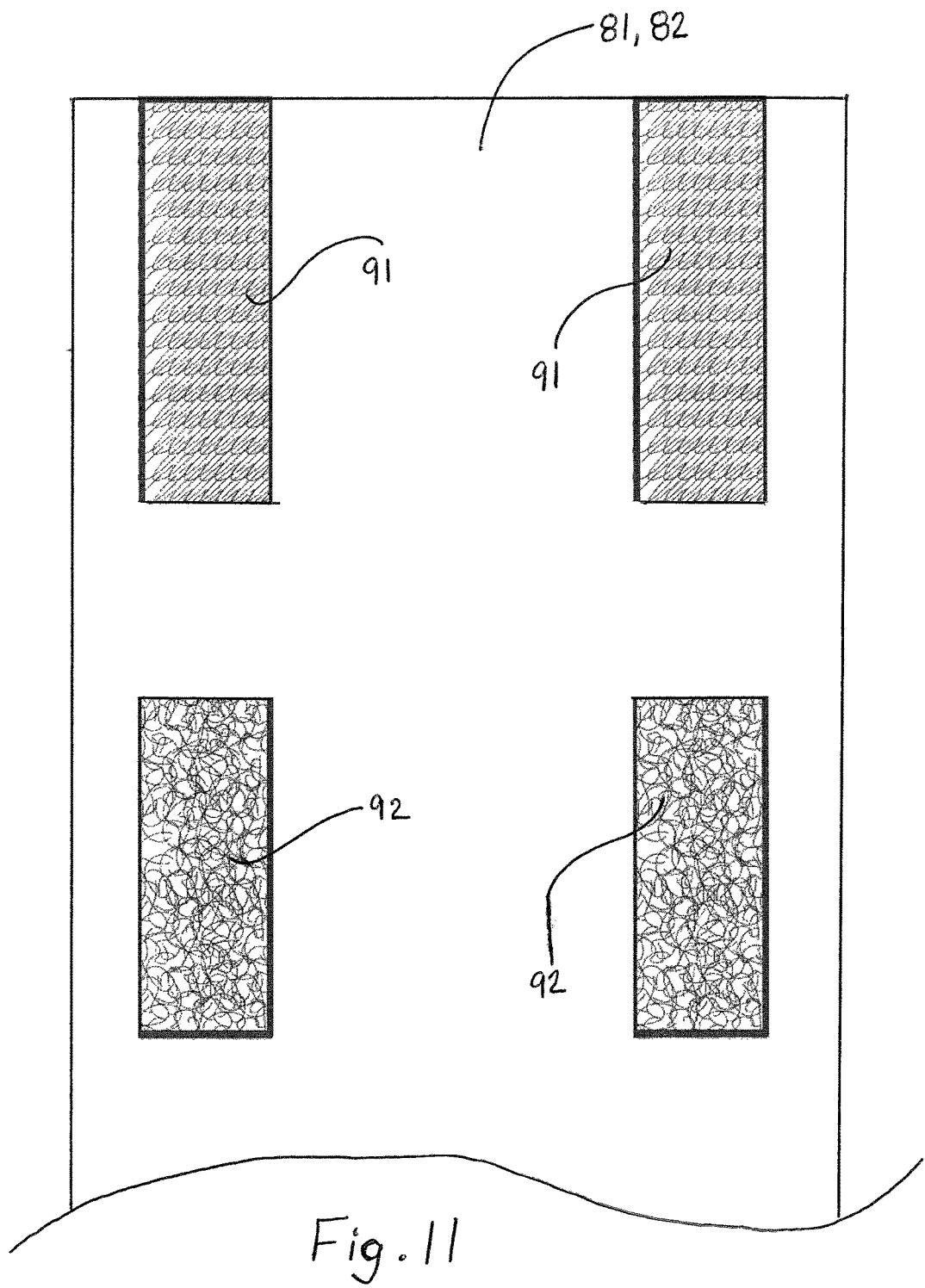
FIG. 11 is another partial perspective view of the apparatus of FIG. 1.
Figure 12:
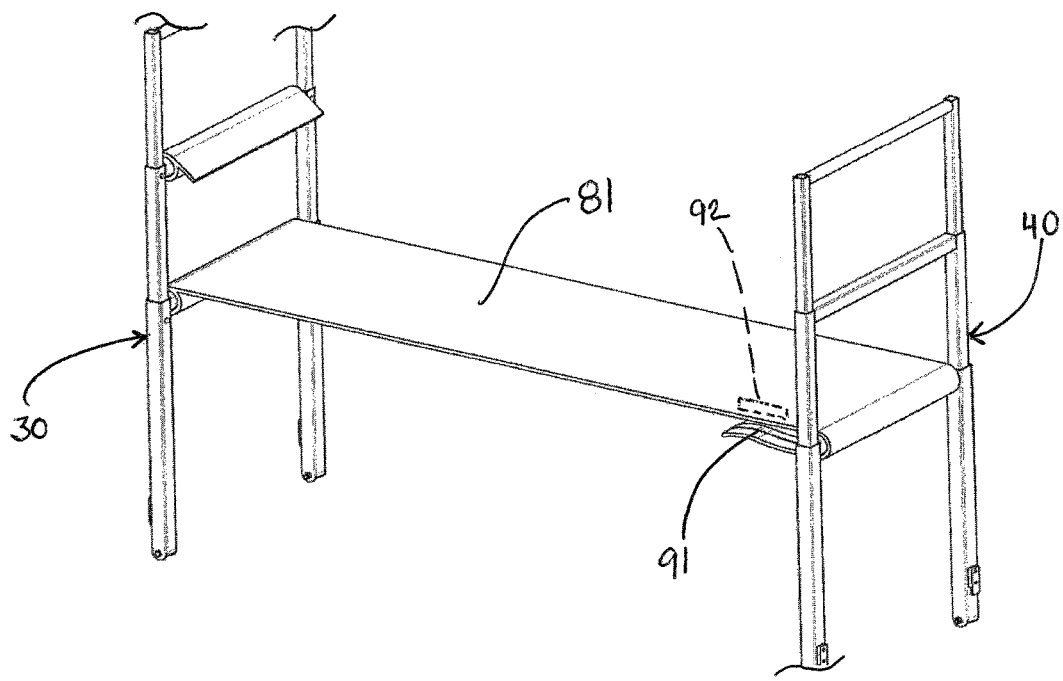
FIG. 12 is another partial perspective view of the apparatus of FIG. 1.

The shelf sections 81, 82 can be attached to the cross bars of the lower and middle segments 41, 42 of support member 40 by attachment means such as hook and loop fastener. Complementary sections 91, 92 of hook fasteners and loop fasteners can be positioned on the underside of each shelf 81, 82, as shown in FIG. 11, to engage each other when the ends of the shelves 81, 82 are wrapped around the cross bars of the lower and middle support segments 41, 42 of support member 40, as shown in FIGS. 5 and 12. Alternatively, a plurality of clasps can be positioned on each shelf 81, 82 that engage the cross bars of the lower and middle support segments 41, 42 of support member 40.

Once the shelf sections 81, 82 are attached to the lower and middle segments 41, 42, of support member 40, items to be stored and transported on the apparatus 10 can be positioned on the fully extended shelf sections 81, 82, as well as on the top surface 14 of the base platform 12. The fully extended shelf sections 81, 82 create three compartments within which items can be organized for storage and/or transport on the apparatus 10.

Two cylindrical receptacles 68, 69 can be positioned on the top surface 14 of the mid-section 53 of the base platform 12, as shown in FIG. 5. The cylindrical receptacles 67, 68 receive and releasably engage two center support rods 91, 92, respectively, as shown in FIG. 6. The support rods 91, 92 can be releasably engaged to the receptacles 67, 68 by spring loaded snap buttons positioned at the bottom end of the rods that are received in apertures formed in the receptacles 67, 68. A cross bar 93 joins the support rods 91, 92.

The lower fabric shelf 81 can be attached to the cross bar 93, as shown in FIG. 6. As such, the user can select between a fully extended position for the lower shelf 81, shown in FIG. 5, in which the shelf 81 is attached to the lower segment 41 of support member 40, and a partially extended position, shown in FIG. 6, in which the lower shelf 81 is attached to the cross bar 93 joining supporting rods 91, 92. When the partially extended position is desired the support rods 91, 92 are mounted on the base platform 12 in the cylindrical receptacles 67, 68, and the cross bar 93 is attached to the rods 91, 92. When the fully extended position is desired the support rods 91, 92 are removed from the receptacles 67, 68.

Figure 7:
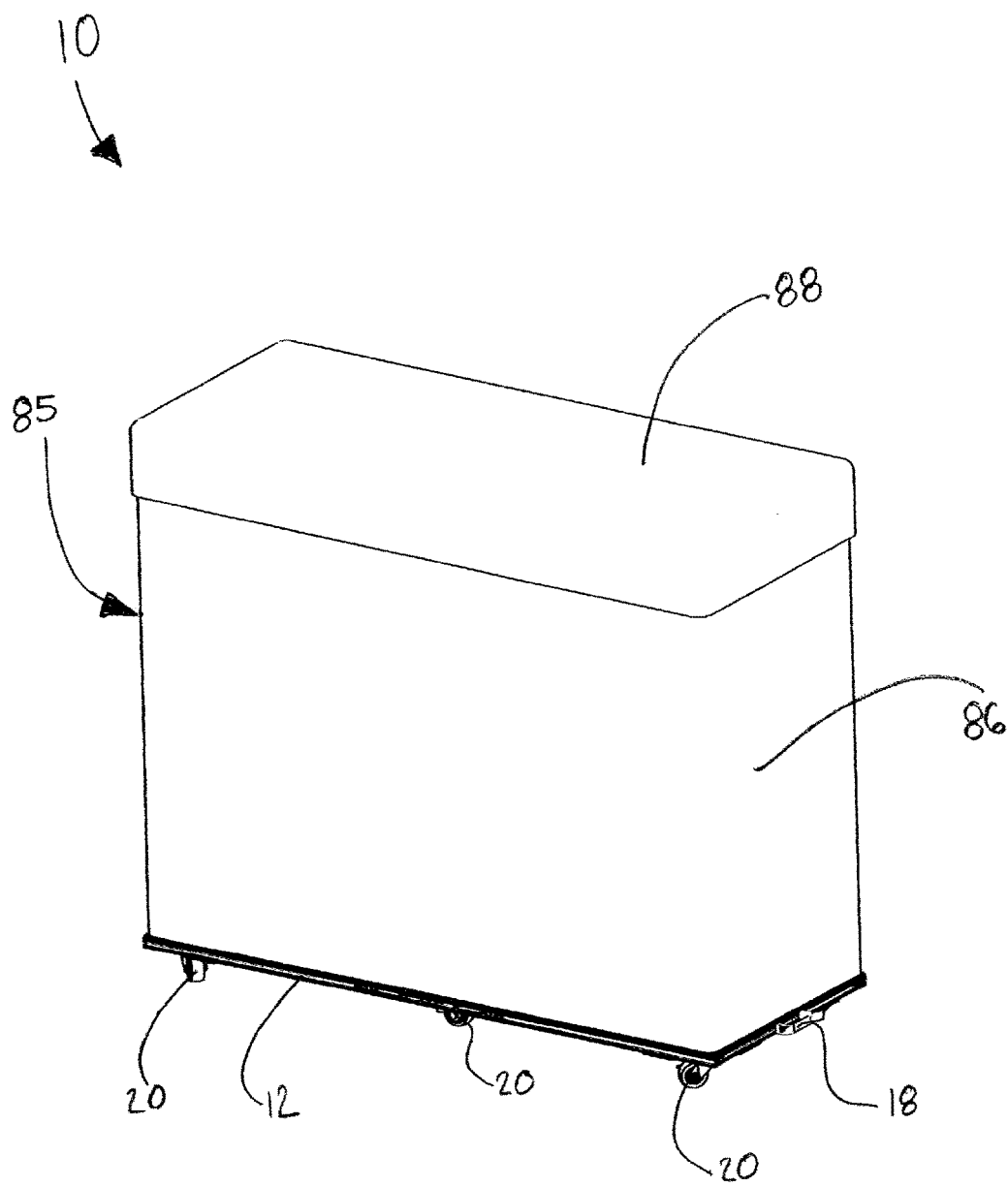
FIG. 7 is another perspective view of the apparatus of FIG. 1.

After the apparatus 10 is fully loaded with items, a fabric cover 85 can be positioned on the exterior of the apparatus 10, as shown in FIG. 7. The cover comprises a fabric sidewall 86 and a fabric top 88. The fabric sidewall 86 is releasably engaged to the apparatus by hook and loop fastener, or other suitable attachment means. A plurality of sections of hook fasteners can be positioned on the support members 30, 40 and on the base platform 12, and a plurality of sections of loop fasteners are positioned on the interior surface of the fabric sidewall 91 such that the loop fastener sections on the sidewall 86 mate with the hook fastener sections on the support members 30, 40 and the base platform 12. Alternatively, sections of hook fasteners can be positioned on the interior surface of the fabric sidewall 86, and complementary sections of loop fasteners can be positioned on the support members 30, 40 and the base platform 12. The top cover 88 is releasably engaged to the sidewall 86 by a zipper, or other suitable attachment means. The fabric cover 85 can be made of durable ballistic nylon, or other suitable material. An adjustable handle can be attached to the exterior surface of the fabric sidewall 86 to facilitate pulling and pushing of the apparatus 10.

Figure 8:
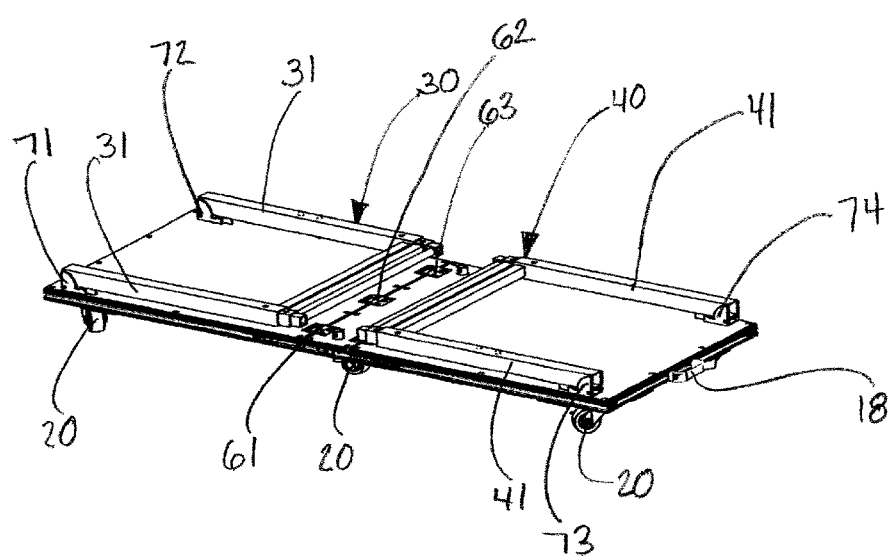
FIG. 8 is another perspective view of the apparatus of FIG. 1.
Figure 9:
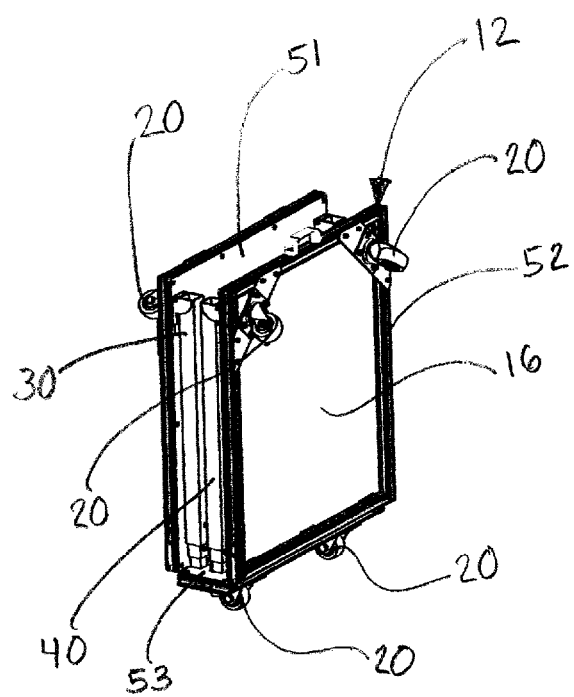
FIG. 9 is another perspective view of the apparatus of FIG. 1.

When not in use, the apparatus can be transformed into a storage position, shown in FIG. 9. The shelf sections 81, 82 are detached from the support member 40, and the user pulls on the shelf sections 81, 82, resulting in the roll-up mechanism winding the shelf sections 81, 82 up on the cross bars of the lower and middle support sections 31, 32. The support members 30, 40 are moved to the collapsed position, shown in FIG. 3. With the support members 30, 40 pivotally connected to the upper surface 14 of the platform 12 by hinges 71, 72, 73, 74, the support members 30, 40 can be pivoted from an upright position, shown in FIG. 3, in which the support members 30, 40 extend upwardly from the base platform 12 and is substantially perpendicular to the base platform 12, to a folded position, shown in FIG. 8, in which the support members 30, 40 lie flat on the upper surface 14 of the base platform 12. The end section 51 of the base platform 12 can be folded upwardly via hinges 61, 62, 63, and the other end section 52 can be folded upwardly via hinges 64, 65, 66, as shown in FIG. 9. As such, the ends of the support members 30, 40 are positioned against the mid-section 53 of the base platform 12, as shown in FIG. 5. In this storage position shown in FIG. 9, the apparatus 10 can be easily rolled along the floor on the two wheels 20 positioned on the under side 16 of the mid-section 53 of the platform 12. Alternatively, the user can pick the apparatus up by grasping a handle 18 attached at one end of the base platform 12. The apparatus 10 can then be easily stored until it is to be used again to transport items.

When the user wishes to use the apparatus 10 again, the above steps can be repeated in reverse. The base platform 12 is moved back to a loading position. The end section 51 of the base platform 12 is folded downwardly via hinges 61, 62, 63, and the other end section 52 is folded downwardly via hinges 64, 65, 66, such that the end sections 51, 52 and mid-section 53 of the base platform 12 lie flat along a common horizontal plane, as shown in FIG. 8. The support members 30, 40 are pivoted from the folded position, shown in FIG. 8, to the upright position, shown in FIG. 3. The support members 30, 40 can be moved from the collapsed position, shown in FIG. 3, to the semi-extended position, shown in FIG. 2, to the fully extended position, shown in FIG. 1. The shelf sections 81, 82 can be pulled out from the cross bars of the lower and middle segments 31, 32 of support member 30 and extended over to be attached to the cross bars of the lower and middle segments 41, 42, respectively, of the other support member 40, as shown in FIGS. 4 and 5. Items can be positioned on the base platform 12, and the shelves 81, 82.

The collapsible framing and middle hinges 61, 62, 63, 64, 65, 66 allow the apparatus 10 to be able to collapse fully and fold for storage, without the aid of any tools. The apparatus 10 can be altered and customized by selecting one, two or three storage shelf levels to suit the particular items to be transported. The handle 18 allows for easy pushing or pulling of the apparatus 10. The closing zipper ensures that items are fully enclosed and cannot fall out of the apparatus 10 during transport.

The apparatus 10 has a relatively hard bottom platform 12 with wheels 20 that allow the apparatus 10 to be pushed and maneuvered with ease. The apparatus 10 can reduce the number of trips normally required to move items. For example, a family having a day at the beach can load all items in the apparatus 10, instead of making several trips to the car carrying a cooler, umbrella, beach chairs, towels, beach bag, etc., while holding the hands of children. The apparatus 10 helps alleviate carrying all of those items and reduce multiple trips to just one.

The apparatus 10 can be used as a three-compartment unit. For example, a college student who is moving on campus may have electronics such as refrigerator, television, computer, cleaning supplies, and clothing. It is generally desirable to keep such items separate from each other, to avoid leakage from the cleaning supplies contacting the electronics or clothing. The shelf sections 81, 82 of the apparatus 10 provide separate compartments in which different items can be positioned.

Preferably, the apparatus 10 is durable like luggage. The fabric exterior cover 85 can be made of a heavy nylon webbing material, which is strong yet aesthetically appealing. The fabric cover 85 can be a variety of colors and textures. In addition, on the exterior surface of the fabric cover 85 there can be insignia, such as team logos, school names, company names and brand names. The collapsible frame of the apparatus 10 allows the apparatus 10 to collapse and fold for easy storage in tight places.

The apparatus 10 makes moving various items easy. Totally different items, such as electronics, clothing, cleaning supplies, etc., can be stored in the three separate compartments of the apparatus 10 defined by the base platform 12, and the shelf sections 81, 82. Electronic devices can be stored on the base platform 21, miscellaneous items can be positioned on the shelf sections 81, 82.

A large amount of essential items can be easily moved using the apparatus 10. Storage is easy with the hinges 61, 62, 63, 64, 65, 66 allowing folding once the apparatus 10 has been fully compressed.

A storage and transport apparatus and methods of using same are described above. Various changes can be made to the invention without departing from its scope. The above description of the preferred embodiments and best mode of the invention are provided for the purpose of illustration only and not limitation—the invention being defined by the claims and equivalents thereof.

What is claimed is:

1. A storage and transport apparatus comprising:
   (a) a base platform having a top surface and a bottom surface, and first and second opposed sides, the base platform adapted for carrying a load thereon;
   (b) a plurality of wheels attached to the bottom surface of the base platform;
   (c) a first support member pivotally connected to the upper surface of the base platform proximate the first side of the base platform, and a second support member pivotally connected to the upper surface of the base platform proximate the second side of the base platform, wherein the support members are pivotable between a folded position wherein the support members lie flat on the upper surface of the base platform and an upright position wherein the support members extend upwardly from the base platform and is substantially perpendicular to the base platform;
   (d) at least one shelf section attached to the first support member and adapted for releasable attachment to the second support member; and
   (e) at least one auxiliary support member releasably mounted on the base platform at a position intermediate the first and second support members, the at least one auxiliary support member adapted for releasably engaging the at least one shelf section whereby the at least one shelf section is moveable between a fully extended position wherein the at least one shelf section is attached to the first support member and the second support member and a semi-extended position wherein the at least one shelf section is attached to the first support member and the at least one auxiliary support member and is not attached to the second support member.

2. The apparatus according to claim 1, wherein the at least one shelf section comprises a layer of fabric wound on a roll-up mechanism positioned on the first support member.

3. The apparatus according to claim 1, wherein the first support member comprises a first plurality of telescopic support segments, and the second support member comprises a second plurality of telescopic support segments.

4. The apparatus according to claim 3, wherein each of the first and second pluralities of telescopic support segments comprise a first telescopic segment and a second telescopic segment telescopically positioned within the first telescopic segment, wherein the telescopic segments are moveable between a collapsed position and an extended position, wherein the second telescopic segment is extended upwardly in relation to the first telescopic segment.

5. The apparatus according to claim 4, further comprising a first locking mechanism functionally connected to the first plurality of telescopic support segments, wherein the first locking mechanism releasably maintains the first telescopic segments in the extended position, and a second locking mechanism functionally connected to the second plurality of telescopic support segments, wherein the second locking mechanism releasably maintains the second telescopic segments in the extended position.

6. The apparatus according to claim 3, wherein each of the first and second pluralities of telescopic support segments comprise lower, middle and upper telescopic segments, the upper telescopic segment telescopically positioned within the middle telescopic segment and the middle telescopic segment telescopically positioned within the lower telescopic segment, whereby each of the first and second support members are moveable from a collapsed position to a semi-extended position to a fully extended position.

7. The apparatus according to claim 6, wherein each of the lower, middle and upper support segments comprise a pair of substantially parallel bars joined by a substantially perpendicular cross bar.

8. The apparatus according to claim 7, wherein the at least one shelf section comprises:
   (a) a first shelf section comprising a fabric layer wound on a roll-up mechanism positioned on the cross bar of the middle support segment of the first support member, and attachment means for releasably attaching the fabric layer to the cross bar of the middle support segment of the second support member; and
   (b) a second shelf section comprising a fabric layer wound on a roll-up mechanism positioned on the cross bar of the upper support segment of the first support member, and attachment means for releasably attaching the fabric layer to the cross bar of the upper support segment of the second support member.

9. The apparatus according to claim 8, wherein the at least one auxiliary support member comprises:
   (a) a first auxiliary support rod releasably engaged to a first receptacle positioned on the top surface of the base platform; and
   (b) a second auxiliary support rod releasably engaged to a second receptacle positioned on the top surface of the base platform, wherein the first and second auxiliary support rods are adapted to support and releasably engage the first shelf section whereby the first shelf section can be in a semi-extended position.

10. The apparatus according to claim 1, wherein the base platform is substantially rectangular and comprises:
    (a) a mid-section having first and second opposed edges;
    (b) a first end section pivotally connected to the first edge of the mid-section; and
    (c) a second end section pivotally connected to the second edge of the mid-section, whereby the base platform can be moved from a loading position wherein the mid-section, the first end section and the second end section are substantially co-planar, to a storage position wherein the first and second end sections extend substantially perpendicular to the mid-section.

11. The apparatus according to claim 10, wherein the first end section is pivotally connected to the mid-section by a first plurality of hinges, and the second end section is pivotally connected to the mid-section by a second plurality of hinges.

12. The apparatus according to claim 10, wherein the plurality of wheels comprises first and second wheels attached to the first end section, third and fourth wheels attached to the second end section, and fifth and sixth wheels attached to the mid-section.

13. The apparatus according to claim 10, wherein the first support member is mounted on the first end section, the second support member is mounted on the second end section, and the at least one auxiliary member comprises first and second auxiliary support rods releasably mounted on the mid-section and adapted to support and releasably engage the at least one shelf section in the semi-extended position.

14. The apparatus according to claim 1, further comprising a fabric cover releasably attached to the first and second support members.

15. The apparatus according to claim 14, wherein the fabric cover is comprised of nylon, and comprises a sidewall section releasably attached to a top section.

16. A storage and transport apparatus comprising:
  (a) a substantially rectangular base platform having a top surface and a bottom surface, first and second opposed sides, and third and fourth opposed sides substantially perpendicular to the first and second opposed sides, the base platform adapted for carrying a load thereon and comprised of first and second end sections pivotally connected to a mid-section;
  (b) a plurality of wheels attached to the bottom surface of the base platform;
  (c) a first support member pivotally connected to the upper surface of the base platform proximate the first side of the base platform, and a second support member pivotally connected to the upper surface of the base platform proximate the second side of the base platform;
  (d) wherein the apparatus is moveable between a loading position wherein the mid-section, the first end section and the second end section are co-planar and the support members extend substantially upwardly from the base platform, to a storage position wherein the support members lie flat on the upper surface of the base platform and the first and second end sections extend substantially perpendicular to the mid-section; and
  (e) at least one shelf section comprising a layer of fabric wound on a roll-up mechanism positioned on the first support member and releasably engaged to the second support member.

17. The apparatus according to claim 16, further comprising:
  at least one auxiliary support member releasably mounted on the mid-section of the base platform, the at least one auxiliary support member adapted for releasably engaging the at least one shelf section.

18. A method of transporting items comprising:
  (a) providing a storage and transport apparatus comprising:
    (i) a base platform having a top surface and a bottom surface, and first and second opposed sides, the base platform comprised of first and second end sections pivotally connected to a mid-section,
    (ii) a plurality of wheels attached to the bottom surface of the base platform,
    (iii) a first support member pivotally connected to the upper surface of the base platform proximate the first side of the base platform, and a second support member pivotally connected to the upper surface of the base platform proximate the second side of the base platform,
    (iv) at least one shelf section comprising a layer of fabric wound on a roll-up mechanism positioned on the first support member and releasably attached to the second support member,
    (iv) wherein the apparatus is moveable between a loading position wherein the mid-section, the first end section and the second end section are co-planar and the support members extend substantially upwardly from the base platform, to a storage position wherein the support members lie flat on the upper surface of the base platform and the first and second end sections extend substantially perpendicular to the mid-section;
  (b) moving the apparatus to the loading position;
  (c) attaching the at least one shelf section to the second support member; and
  (d) loading items on the base platform and the at least one shelf section.

19. The method according to claim 18, further comprising:
  (a) releasing the at least one shelf section from the second support member; and
  (b) moving the apparatus to the storage position.

* * * * *